(12) United States Patent
Cordeiro et al.

(10) Patent No.: US 8,503,377 B2
(45) Date of Patent: Aug. 6, 2013

(54) METHODS FOR MULTI-BAND WIRELESS COMMUNICATION AND BANDWIDTH MANAGEMENT

(75) Inventors: Carlos Cordeiro, Portland, OR (US); Minyoung Park, Portland, OR (US)

(73) Assignee: Intel Corporation, Santa Clara, CA (US)

(*) Notice: Subject to any disclaimer, the term of this patent is extended or adjusted under 35 U.S.C. 154(b) by 812 days.

(21) Appl. No.: 12/284,951

(22) Filed: Sep. 25, 2008

(65) Prior Publication Data
US 2010/0074190 A1  Mar. 25, 2010

(51) Int. Cl.
*H04W 4/00* (2009.01)
(52) U.S. Cl.
USPC ...... 370/329; 370/343; 455/532.1; 455/456.1
(58) Field of Classification Search
USPC ............... 370/329, 343; 455/552.1, 456.1
See application file for complete search history.

(56) References Cited

U.S. PATENT DOCUMENTS

| | | |
|---|---|---|
| 2002/0176437 A1 | 11/2002 | Busch et al. |
| 2005/0163078 A1 | 7/2005 | Oba et al. |
| 2006/0135066 A1 | 6/2006 | Banerjea |
| 2006/0223574 A1* | 10/2006 | Chandra ............... 455/552.1 |
| 2007/0086378 A1 | 4/2007 | Matta et al. |
| 2009/0088183 A1* | 4/2009 | Piersol et al. ......... 455/456.1 |
| 2010/0014502 A1* | 1/2010 | Singh et al. ............ 370/343 |
| 2010/0046455 A1* | 2/2010 | Wentink et al. ........ 370/329 |
| 2010/0330914 A1 | 12/2010 | Chandra |
| 2011/0096747 A1* | 4/2011 | Seok ...................... 370/329 |

FOREIGN PATENT DOCUMENTS

| | | |
|---|---|---|
| CN | 1272981 A | 11/2000 |
| CN | 101156421 A | 4/2008 |
| JP | 2007-522725 A | 8/2007 |
| JP | 2008535398 A | 8/2008 |
| WO | 2006/088082 A1 | 8/2006 |
| WO | 2007/142443 A1 | 12/2007 |
| WO | 2010/036595 A2 | 4/2010 |
| WO | 2010/036595 A3 | 5/2010 |

OTHER PUBLICATIONS

International Preliminary Report on Patentability received for PCT Patent Application No. PCT/US2009/057633, mailed Apr. 7, 2011, 6 pages.
International Search Report/Written Opinion for Patent Application No. PCT/US2009/057633, mailed Apr. 1, 2010, 11 pages.
Office Action received for Chinese Patent Application No. 200910221481.8, mailed on May 4, 2012, 14 pages of English Translation and 10 pages of Chinese Office Action.
Office Action received for Japanese Patent Application No. 2011-529141, mailed on Oct. 16, 2012, 3 pages of English Translation and 4 pages of Japanese Office Action.
Office Action received for Chinese Patent Application No. 200910221481.8, mailed on Oct. 25, 2012, 3 pages of English Translation and 3 pages of Chinese Office Action.

\* cited by examiner

*Primary Examiner* — Albert T Chou
(74) *Attorney, Agent, or Firm* — Forefront IP Lawgroup, PLLC

(57) ABSTRACT

Embodiments of methods for multi-band wireless communication and bandwidth management are described herein. Other embodiments may be described and claimed.

20 Claims, 5 Drawing Sheets

METHODS FOR MULTI-BAND WIRELESS COMMUNICATION AND BANDWIDTH MANAGEMENT

FIELD OF THE INVENTION

The field of invention relates generally to a multi-band wireless system and more specifically but not exclusively relates to methods for transmitting and receiving multi-band signals in WPAN/WLAN environments.

BACKGROUND INFORMATION

Technological developments permit digitization and compression of large amounts of voice, video, imaging, and data information. The need to transfer data between stations in wireless radio communication requires reception of a reliable data stream at a high data rate. It would be advantageous to provide a method for reliable multi-band communications between two or more stations where communications over a communication channel in a multi-band communication is less robust than an alternate channel.

BRIEF DESCRIPTION OF THE DRAWINGS

The present invention is illustrated by way of example and not as a limitation in the figures of the accompanying drawings, in which.

DETAILED DESCRIPTION

Figure 1:
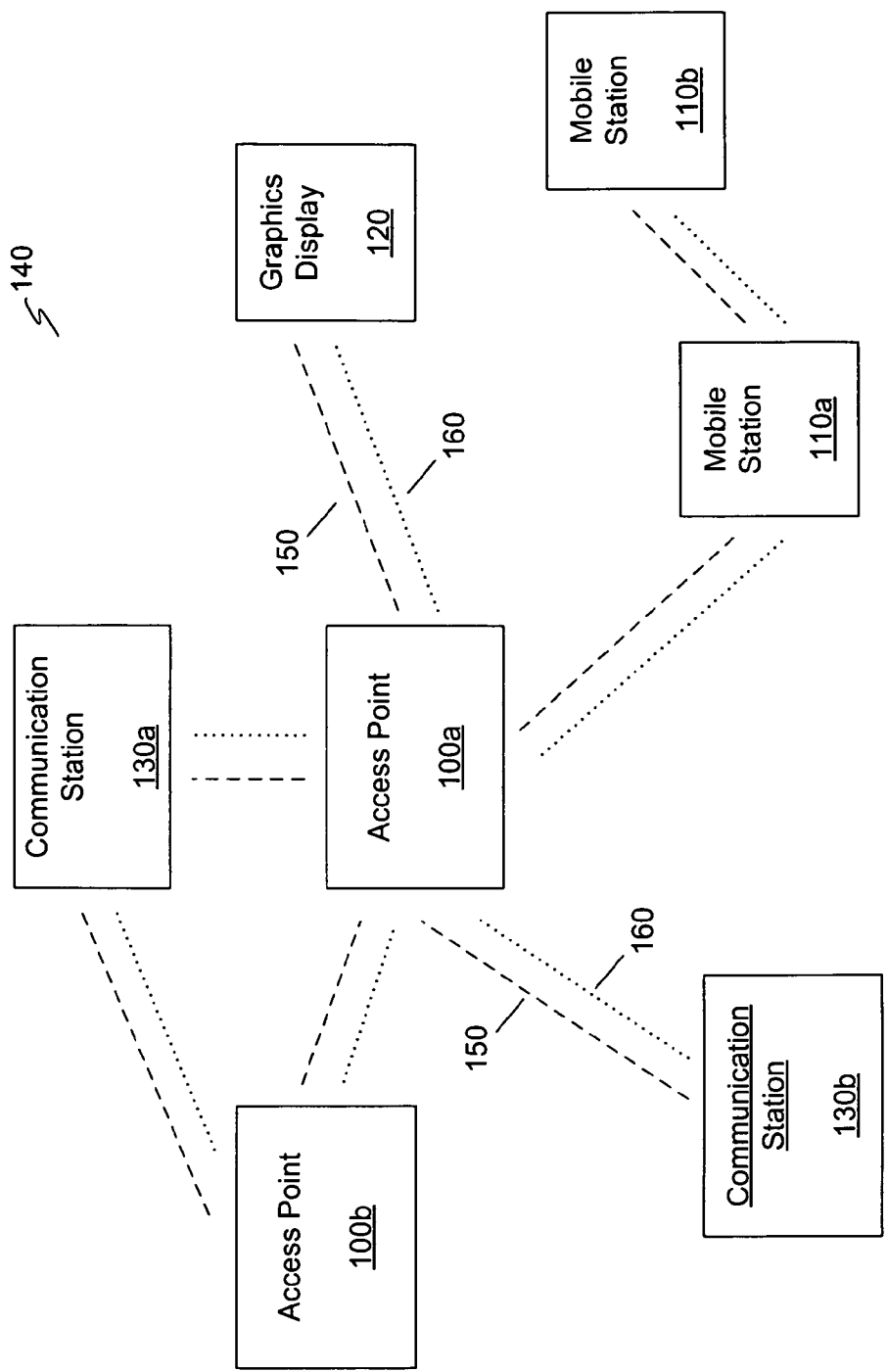
FIG. 1 is a block diagram illustrating stations using a plurality of communication channels to communicate in a wireless network.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of methods and systems for multi-band wireless communication and bandwidth management are described herein. In the following description, numerous specific details are set forth such as a description of a discovery and association mechanism for multi-band wireless systems to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

It would be an advance in the art to provide a discovery and association mechanism for multi-band wireless systems communicating over a plurality channels or spectrum bands. As an example, wireless stations may comprise a host processor, a flash memory device, a random access memory and a transceiver configured to communicate either sequentially or simultaneously over a millimeter wave (mm-wave) network and a lower frequency network using wireless local area network (WLAN) and wireless personal area network (WPAN) technologies. MM-wave communication is desirable for relatively high throughput communications while providing high frequency reuse potential. However, a mm-wave communications link operating in a 60 GHz band ((57-66 GHz) is less robust than those operating at lower frequencies (e.g. 2.4 GHz and 5 GHz bands) because of both oxygen absorption, which attenuates the signal over long range, and its short wavelength, which provides attenuation through obstructions such walls and ceilings. Use of a second communications link operating at one or more lower frequencies may provide one or more channels for discovering and associating a station that would otherwise not be capable of communicating at the higher frequency. A mechanism to achieve efficient and robust communication using multi-band stations may provide enhanced data communication efficiency by providing discovery and association between the multi-band stations for isochronous and asynchronous data traffic.

Embodiments of multi-band stations may be used in a variety of applications. Some embodiments of the invention may be used in conjunction with various devices and systems, for example, a transmitter, a receiver, a transceiver, a transmitter-receiver, a wireless communication device, a wireless Access Point (AP), a modem, a wireless modem, a Personal Computer (PC), a desktop computer, a mobile computer, a laptop computer, a notebook computer, a tablet computer, a server computer, a set-top box, a handheld computer, a handheld station, a Personal Digital Assistant (PDA) device, a handheld PDA device, a mobile station (MS), a graphics display, a communication station, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Institute of Electrical Institute of Electrical and Electronic Engineers (IEEE) 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Turning now to the figures, FIG. 1 is a block diagram illustrating stations, such as access points (100a & 100b), mobile stations (110a & 110b), a graphics display (120) and communication stations (130a & 130b) using multi-band radio signals to communicate in a multi-band wireless network 140. Access point 100a may communicate with another access point 100b and communication stations, such as communication stations (CS) 130a and 130b. The CSs 130a and 130b may be fixed or substantially fixed stations. In some embodiments, an access point 100a may use multi-band radio signals including a first channel 150 and a second channel 160 for communication. In this embodiment, the first channel 150 is a 2.4 GHz band and/or 5 GHz band and the second channel 160 is 60 GHz band, though the scope of the invention is not limited in this respect. Access point 100a may also communicate with other stations such as mobile station 110a and graphics display 120. In some embodiments, access point 100a and mobile station 110a operate as part of a peer-to-peer (P2P) network. In other embodiments access point 100a and mobile station 110a operate as part of a mesh network, in which communications may include packets routed on behalf of other wireless stations of the mesh network, such as mobile station 110b. Fixed wireless access, wireless local area networks, wireless personal area networks, portable multimedia streaming, and localized networks such as an in-vehicle networks, are some examples of applicable P2P and mesh networks.

Figure 2:
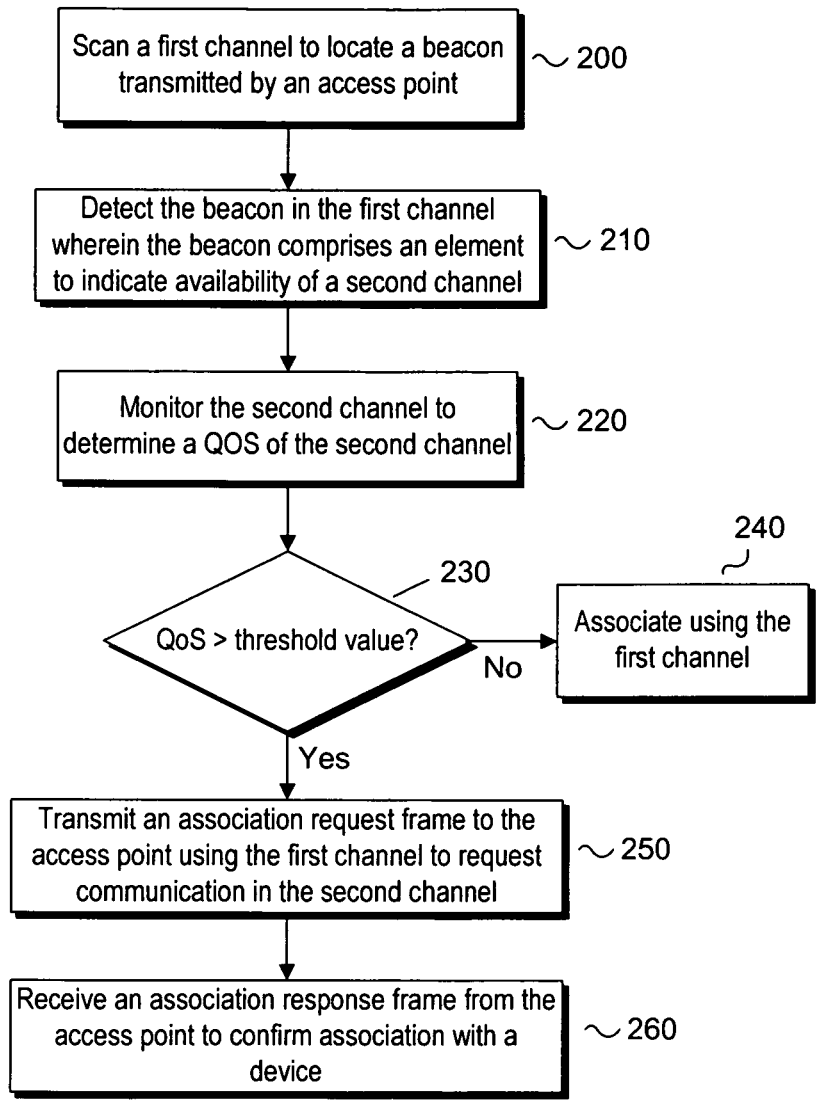
FIG. 2 is a flowchart illustrating one embodiment of an association mechanism for multi-band wireless systems.

FIG. 2 is a flowchart illustrating one embodiment of an association mechanism for multi-band wireless systems. In element 200, a first channel is scanned by a station such as a graphics display 120 to locate a beacon transmitted by an access point 100. In this embodiment, the first channel 150 is a 2.4 GHz spectrum band and/or 5 GHz band channel. The first channel 150 may be configured to communicate over an 802.11 standard such as a protocol developed by 802.11 Very High Throughput (VHT). The lower frequency beacon transmitted in the first channel 150 includes information indicating that the access point 100 is capable of operating in the second channel 160. The second channel 160 may be configured to communicate over an MM-wave (e.g., 60 GHz) protocol such as 802.15.3c.

The lower frequency beacon is detected in element 210 by the station and information in the lower frequency beacon or another information element indicates to the station that the second channel 160 is available for data communication. This information is obtained by decoding the received lower frequency beacon from the first channel 150. Further, an offset of time between the lower frequency beacon and the high frequency beacon is contained in the lower frequency beacon. The offset allows the station to listen to only a portion of a high frequency beaconing period, which may be a relatively small portion of time when compared to the high frequency beaconing period. As a result, an efficiency of a discovery process may be improved and energy consumption used in the discovery process may be reduced.

In this embodiment, the second channel 160 is the 60 GHz band. The station monitors the second channel 160 in element 220 to locate a high frequency beacon and determine if the station can communicate over the second channel reliably, such as by determining a quality of service (QOS) of the second channel based on parameters such as channel load and interference. If the QOS of the second channel is above a threshold value, which may be defined as a value sufficient to provide reliable communication for the type of data communicated over the second channel 160, then an association request (ASS-REQ) frame is transmitted to the access point 100 using the first channel 150 to request communication in the second channel 160 (element 250). Otherwise, the station may associate with the access point 100 using the first channel 150. If the station does transmit an association request frame as detailed in element 250, then the access point 100 transmits and the station receives an association response frame (ASS-RSP) in element 260 to confirm association with the station.

Figure 3:
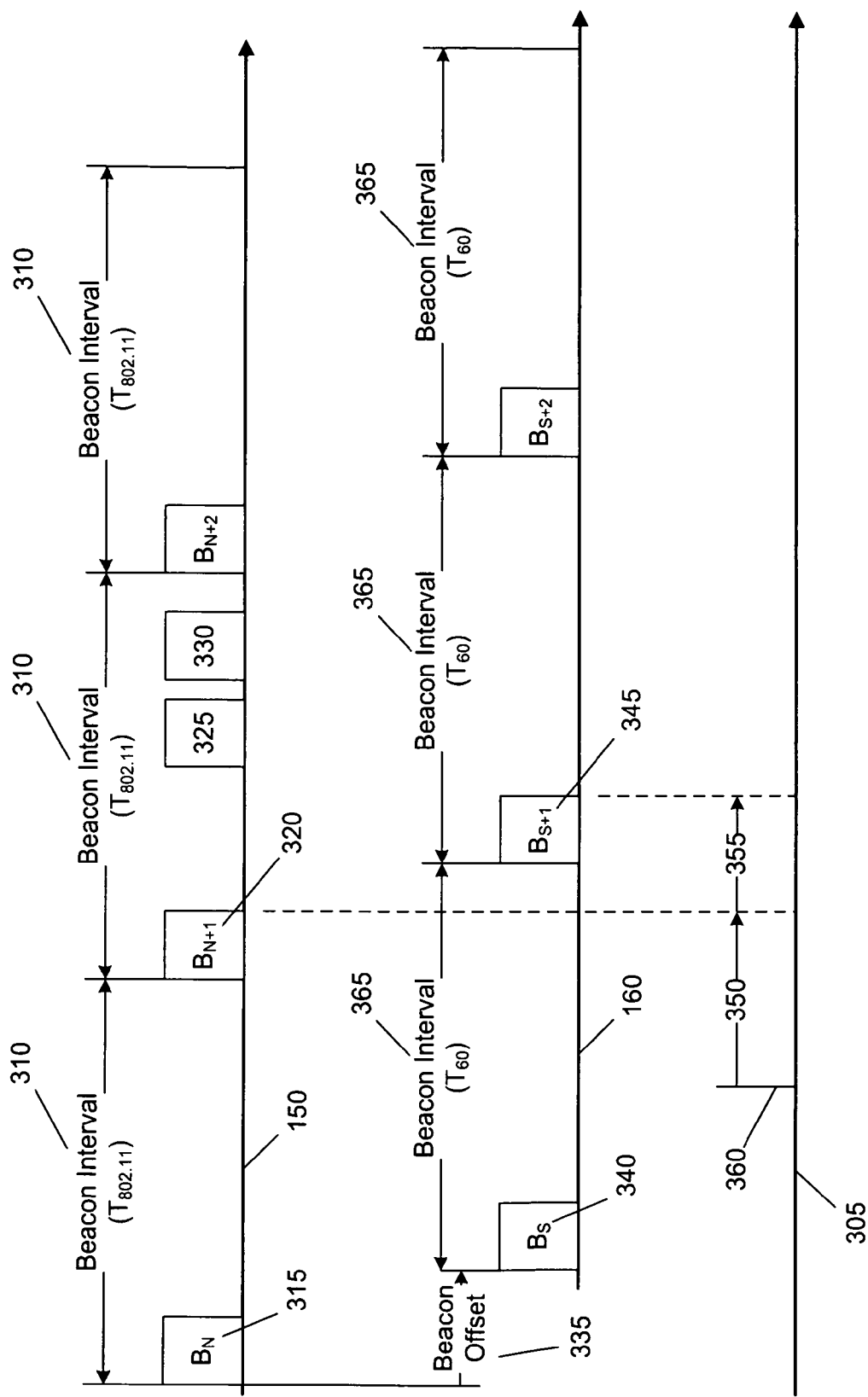
FIG. 3 is an illustration of an embodiment of a discovery and association mechanism for multi-band wireless systems.

FIG. 3 is an illustration of an embodiment of a discovery and association mechanism for multi-band wireless systems according to the method described in FIG. 2. The first channel 150 and the second channel 160 communicate in reference to a communication timeline 305. The first channel 150 in this embodiment communicates according to an 802.11 protocol using a series of lower frequency beacon interval 310 wherein each lower frequency beacon interval 310 comprises a beacon. A first lower frequency beacon 315 transmitted in a first channel 150 is a basic feature in a wireless media access control (MAC) protocol delivering association information. For example, the first lower frequency beacon 315 may be sent from the access point 100 to the mobile station 110 of FIG. 1. The first lower frequency beacon 315 contains an element indicating availability of the second channel 160, such as the higher frequency 60 GHz band. The second channel 160 in this embodiment communicates according to a 60 GHz protocol using a series of higher frequency beacon intervals 365 wherein each higher frequency beacon interval 365 comprises a beacon such as a first high frequency beacon 340 and a second high frequency beacon 345.

A beacon offset 335 is provided to avoid overlapping the first lower frequency beacon 315 with the first high frequency beacon 340. In this embodiment, the beacon offset 335 is a pre-determined value communicated in the first lower frequency beacon 315. Further, the first lower frequency beacon 315 comprises MAC address information of interfaces for the first channel 150 and the second channel 160. The MAC address information allows a station such as the mobile station 110, a graphics display 120, or a communications station 130 to identify that the first lower frequency beacon 315 and the first high frequency beacon 340 correspond to the same access point 100. In this embodiment, the first beacon 315 communicated in the first channel 150 includes a channel number associated with the second channel 160 in which the access point 100 operates. Conversely, the first high frequency beacon 340 communicated in the second channel 160 includes a channel number associated with the first channel 150 in which the access point 100 operates, and also includes a beacon offset 335 to the first low frequency beacon 320 operating in the first channel 150. In another embodiment, the MAC address information, channel number information, and/or the beacon offset 335 are also included in a probe request and/or probe response frames (not shown), for the purpose of active scanning.

In FIG. 3, a station such as the mobile station 110 powers-up or is initialized at station initialization 360. The station is configured to search for a beacon such as the second lower frequency beacon 320 over a low frequency beacon search interval 350. The beacon then searches the second channel 160 using MAC address information, channel number information and/or the beacon offset 335 for the second high frequency beacon 345 over a high frequency beacon receive and association interval 355. The station then proceeds with association with the access point 100 using an association request frame 325 and the association response frame 330. As a result, future data transmissions may be communicated between the station and the access point 100 over the second channel 160 or the first channel 150.

Figure 4:
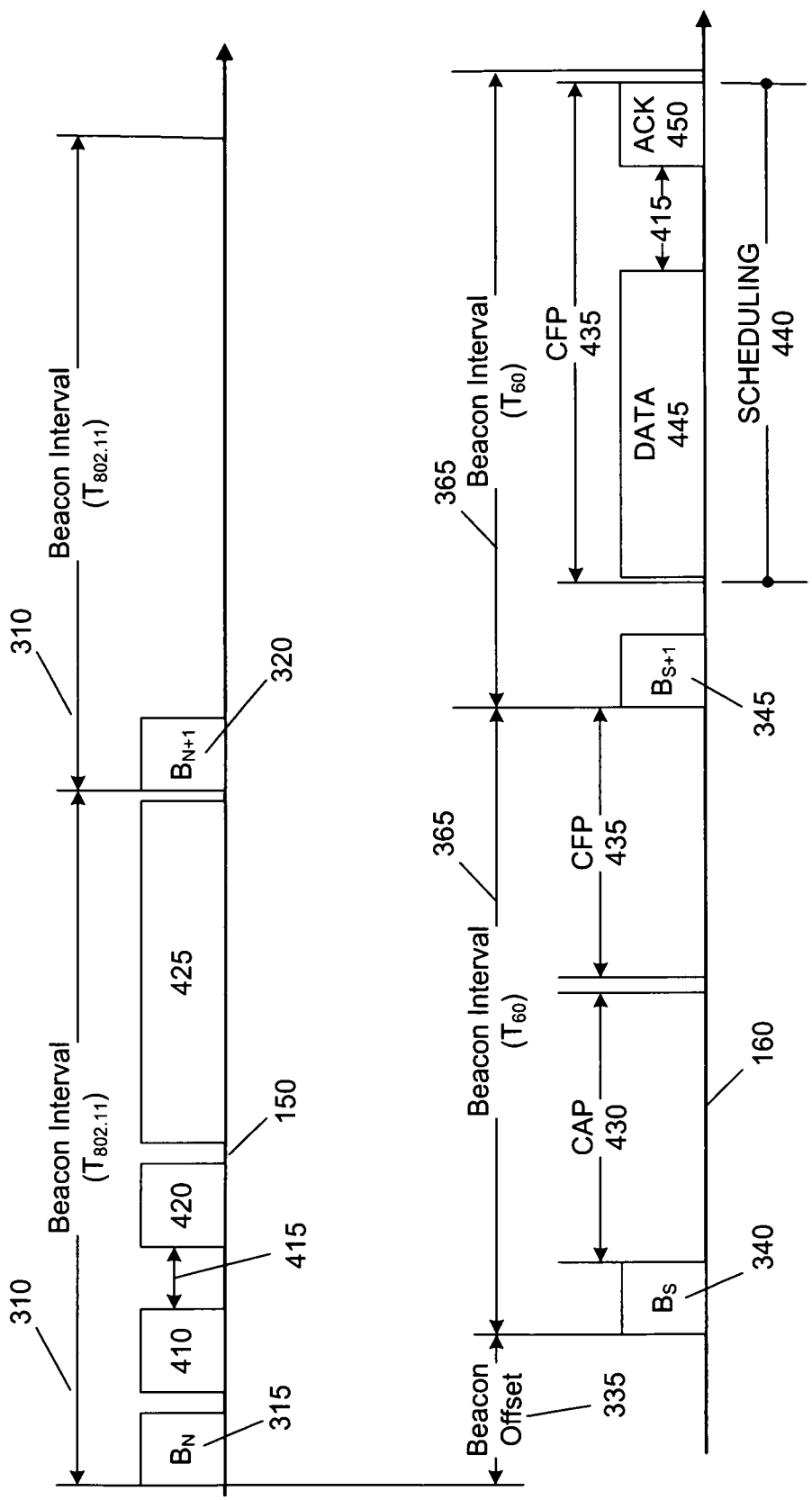
FIG. 4 is an illustration of an embodiment of a multi-band bandwidth reservation mechanism for isochronous data communications.

FIG. 4 is an illustration of a multi-band bandwidth reservation mechanism for isochronous data communications between an access point 100 and a station according to an embodiment of the invention. The station in this embodiment is the mobile station 110 of FIG. 1 and is associated with the access point 100 as described in FIG. 3. The mobile station 110 is attempting to communicate with the access point 100 to transfer isochronous data traffic, such as a video data stream. Transferring the data stream over the second channel 160 may be provided through reservation of bandwidth of the second channel 160 using control messages communicated using the first channel 150.

The mobile station 110 may request bandwidth allocation by sending a reservation request frame 410 addressed to the access point 100 over the first channel 150. The reservation request frame 410 sent by the mobile station 110 may comprise information such as data traffic type, amount of required channel time, channel allocation frequency, and other data. The mobile station 110 then waits for a request acknowledgement 420, a type of high priority transmission, during a short interframe space 415. The first channel 150 may be transferring data for other stations in the low frequency beacon interval 310 and may be busy during a time block 425. The mobile station 110 switches to the second channel 160 for a reservation response frame which can be included in the second high frequency beacon 345, transmitted during the contention based access period (CAP) 430, or other means. The contention based access period 430 is a portion of a higher frequency beacon interval 365 with non-reserved or open channel time allocation or access. The reservation response frame describes the channel time scheduling transmission 440 comprising one or more data blocks 445, one or more short interframe spaces 415, and one or more scheduling acknowledgments 450 during a contention free period 435.

The second channel 160 may be used by one or more stations such as the mobile station 110, the graphics display 120, and one or more communication stations 130 while reserving bandwidth in the second channel 160 using control messages in the first channel 150. The access point 100, upon receiving a reservation request frame 410 from the mobile station 110 reserves a channel time allocation in the second channel 160 and either announces the channel time allocation in the first high frequency beacon 340 or sends a reservation response to the mobile station 110 over the second channel 160. In another embodiment, if the mobile station 110 is unsuccessful in transmitting a reservation request frame 410 over the first channel 150 after a predetermined number of attempts, the mobile station 110 may use the second channel 160 to reserve bandwidth over the second channel 160, though priority is given to the first channel 150 for such control message exchanges.

Figure 5:
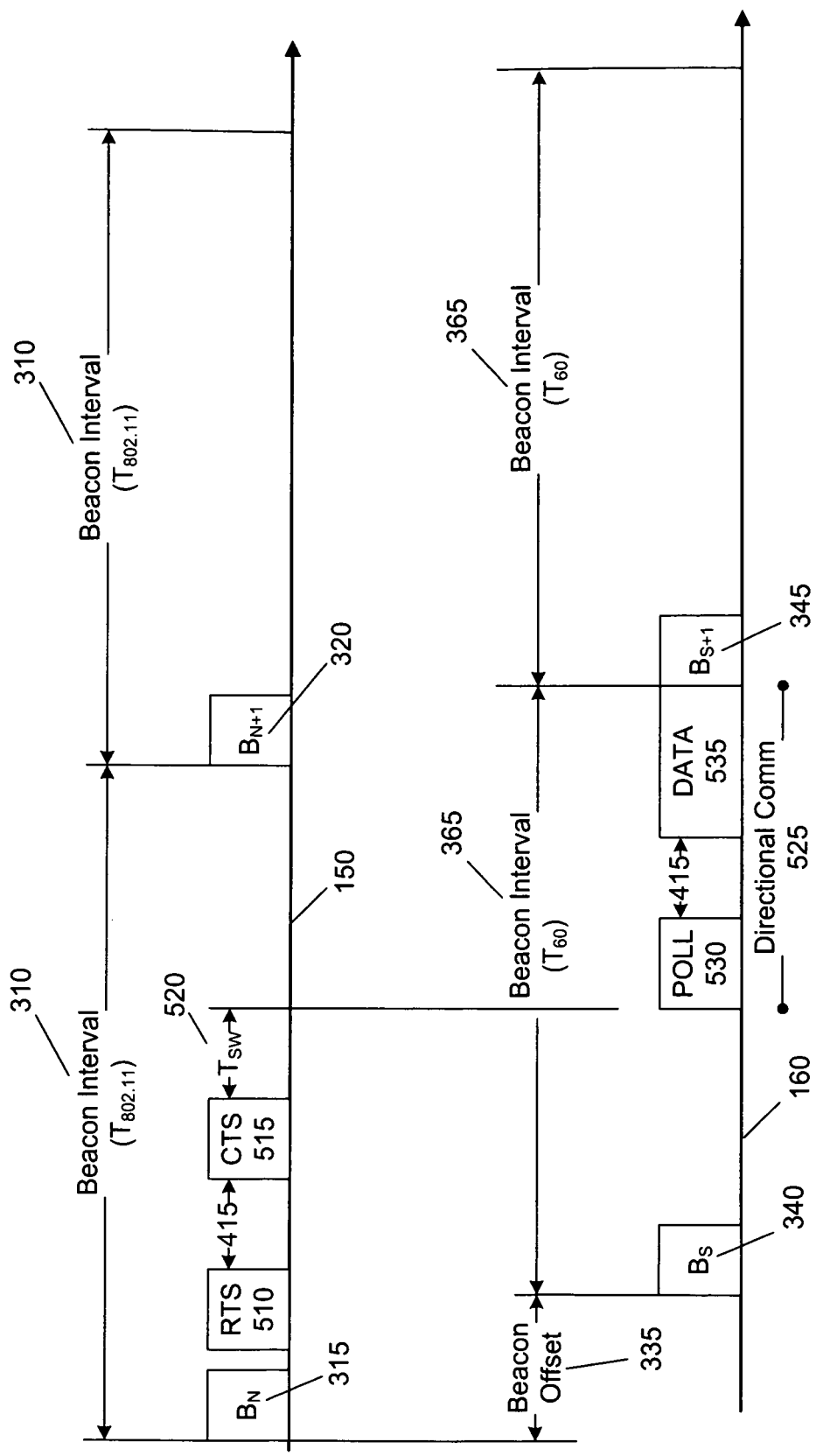
FIG. 5 is an illustration of an embodiment of a multi-band random access and polling mechanism for asynchronous data communications.

FIG. 5 is an illustration of an embodiment of a multi-band random access and polling mechanism for asynchronous data communications between the access point 100 and a station according to an embodiment of the invention. The station in this embodiment is the mobile station 110 of FIG. 1 and is associated with the access point 100 as described in FIG. 3. The mobile station 110 is attempting to communicate with the access point 100 to transfer asynchronous data traffic, such as a bursty data stream. Transferring the bursty data stream over the second channel 160 may be provided using a polling mechanism through the second channel 160 with control messages communicated using the first channel 150. The control messages in this embodiment are a request to send (RTS) frame 510 and a clear to send (CTS) frame 515 separated by the short interframe space 415.

The mobile station 110 initiates communication by sending the request to send frame 510 over the first channel 150. The mobile station 110 indicates that it wants to exchange data over the second channel 160 using the request to send frame 510. A clear to send frame 515 is transmitted and a switch time 520 elapses before a poll frame 530 is transmitted in the second channel 160. The mobile station 110 switches to the second channel 160 during the switch time 520 and waits for the poll frame 530 transmitted by the access point 100. The mobile station 110 is permitted to send its data frame 535 after a short interframe space 415. The poll frame 530, short interframe space 415, and the data frame 535 comprise a directional communication 525 between the access point 100 and the mobile station 110. The mechanism illustrated in FIG. 5 is one embodiment of a use of the first channel 150 for efficiently allocating bandwidth in the second channel 160 for the transfer of bursty data traffic.

While specific embodiments of, and examples for, the invention are described herein for illustrative purposes, various equivalent modifications are possible within the scope of the invention, as those skilled in the relevant art will recognize. In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Modifications may be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method to communicate wirelessly between stations along multiple frequency channels, comprising:
    scanning a first channel to locate a beacon transmitted by an access point;
    detecting the beacon in the first channel wherein the beacon comprises an element to indicate a beacon offset and availability of a second channel, wherein the beacon offset improves discovery process by reducing energy consumption in the discovery process;
    monitoring the second channel to determine a quality of service of the second channel;
    transmitting an association request frame to the access point using the first channel, in response to the quality of service of the second channel, to request communication in the second channel; and
    receiving an association response frame from the access point to confirm association with the station.

2. The method of claim 1, wherein the access point is associated with the station on the first channel and the second channel.

3. The method of claim 1, the beacon further comprising a MAC address of the access point in the second channel.

4. The method of claim 1, the beacon includes the beacon offset to synchronize communication between the station and the access point in the second channel.

5. The method of claim 4, wherein the station monitors the second channel intermittently based on the beacon offset.

6. The method of claim 1, wherein the first channel is in the 2.4/5 GHz band.

7. The method of claim 6, wherein the second channel is in the 60 GHz band.

8. A method for isochronous multi-band wireless communications between an access point and a station, comprising:
  associating the access point with the station along a first channel that includes a beacon comprising an element to indicate a beacon offset and availability of a second channel, wherein the beacon offset improves discovery process by reducing energy consumption in the discovery process;
  receiving a reservation request from the station on the first channel to reserve the second channel;
  transmitting an acknowledgement by the access point in response to the reservation request on the first channel;
  reserving a bandwidth allocation for the station in the second channel;
  transmitting a reservation response, based on the reservation request, to the station in the second channel; and
  transmitting a data frame from the access point to the station using the bandwidth allocation.

9. The method of claim 8, wherein the access point is associated with the station on the first channel and the second channel.

10. The method of claim 8, wherein the reservation request comprises traffic type data, channel time allocation data, and channel frequency allocation data.

11. The method of claim 8, wherein the acknowledgement comprises channel access scheduling data for the second channel.

12. The method of claim 8, wherein the first channel is in the 2.4/5 GHz band.

13. The method of claim 12, wherein the second channel is in the 60 GHz band.

14. The method of claim 8, wherein the data frame is isochronous type data.

15. A method for asynchronous multi-band wireless communications between an access point and a station, comprising:
  associating the station with the access point along a first channel that includes a beacon comprising an element to indicate a beacon offset and availability of a second channel, wherein the beacon offset improves discovery process by redusing energy consumption in the discovery process;
  transmitting a request to send (RTS) signal from the station using the first channel, the RTS signal comprising an element to indicate a request to communicate over the second channel;
  receiving a clear to send (CTS) signal from the access point using the first channel;
  receiving a poll frame from the access point using the second channel; and
  transmitting a data frame to the access point using the second channel.

16. The method of claim 15, wherein the data frame is asynchronous type data.

17. A system for multi-band wireless communications, comprising:
  a host processor;
  a flash memory device;
  a random access memory; and
  a transceiver configured to communicate in a 2.4/5 GHz and a 60 GHz band by;
    locating a beacon transmitted in the 2.4/5 GHz band, wherein the beacon comprises an element to indicate a beacon offset and an availability of the 60 GHz band, wherein the beacon offset improves discovery process by reducing energy consumption in the discovery process,
    determining a quality of service of the 60 GHz band,
    transmitting an association request frame using the 2.4/5 GHz band in response to the quality of service of the 60 GHz band,
    requesting communication in the 60 GHz band, and
    receiving an association response frame to confirm association.

18. The system of claim 17, the beacon further comprising a MAC address of the access point in the 60 GHz band.

19. The system of claim 17, the beacon further comprising an offset to synchronize communication between an access point and a station in the 60 GHz band.

20. The system of claim 17, wherein the station monitors the 60 GHz band intermittently based on the offset.

* * * * *